US005353214A

United States Patent [19]

Kim

[11] Patent Number: 5,353,214

[45] Date of Patent: Oct. 4, 1994

[54] NEON CIRCUIT INCLUDING A PROTECTIVE STRUCTURE

[75] Inventor: Hyung-Kwang Kim, Seoul, Rep. of Korea

[73] Assignee: DNF Electronics Co., Ltd., Kyungbuk, Rep. of Korea

[21] Appl. No.: 990,240

[22] Filed: Dec. 14, 1992

[30] Foreign Application Priority Data

Oct. 8, 1992 [KR] Rep. of Korea .................... 92-18443

[51] Int. Cl.$^5$ ....................... H02H 7/122; H05B 37/02

[52] U.S. Cl. ................................. 363/56; 315/DIG. 7

[58] Field of Search ........................ 363/52, 55, 56, 58, 363/131–134; 323/207, 222, 908; 361/90–93, 103; 315/291, DIG. 2, DIG. 7

[56] References Cited

U.S. PATENT DOCUMENTS

| | | | |
|---|---|---|---|
| 3,619,713 | 11/1971 | Biega et al. | 315/DIG. 7 |
| 4,712,045 | 12/1987 | Van Meurs | 315/DIG. 7 |
| 5,142,202 | 8/1992 | Sun et al. | 363/56 |
| 5,179,509 | 1/1993 | Ling | 363/56 |

*Primary Examiner*—Steven L. Stephan

*Assistant Examiner*—Matthew Nguyen

[57] ABSTRACT

A neon circuit includes a protective function and provides for an adjustable output voltage and an adjustable luminous intensity. The neon circuit when there is a neon bulb present as the load such as a sodium or mercury lamp provides for power saving and its life is lengthened with high dependability. The circuit includes a line filter and a high powered factor compensation circuit.

10 Claims, 4 Drawing Sheets

NEON CIRCUIT INCLUDING A PROTECTIVE STRUCTURE

DESCRIPTION OF THE SYMBOLS GIVEN FOR MAJOR PARTS OF THE DRAWINGS

Figure 1:
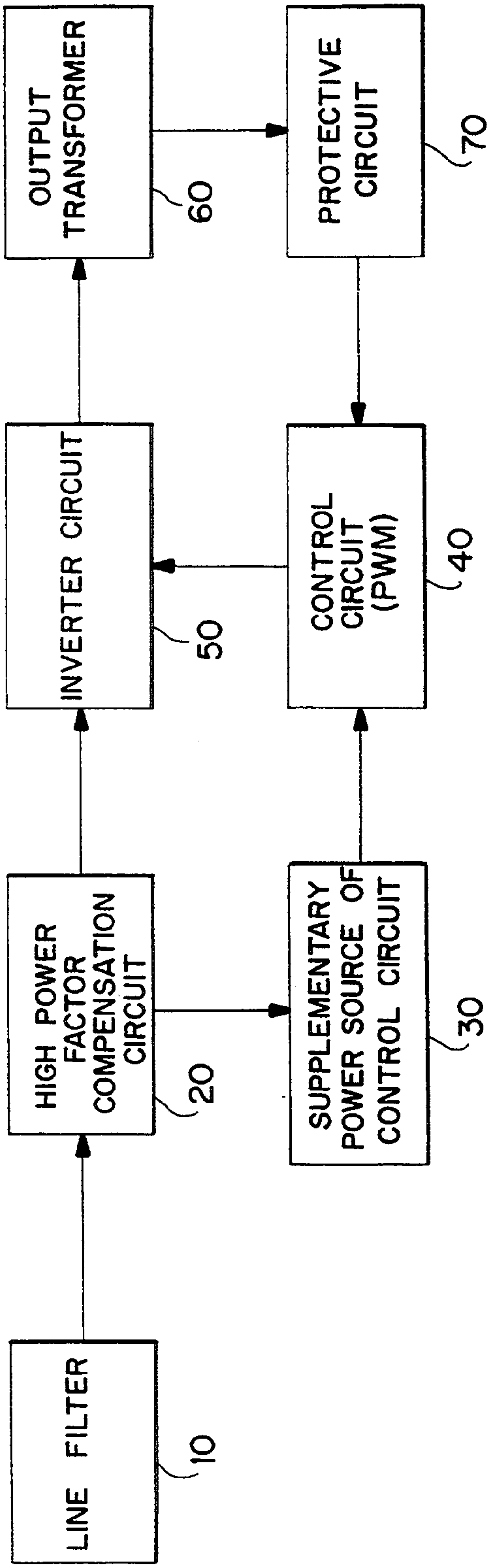
FIG. 1 is a block diagram of the present invention.
Figure 2:
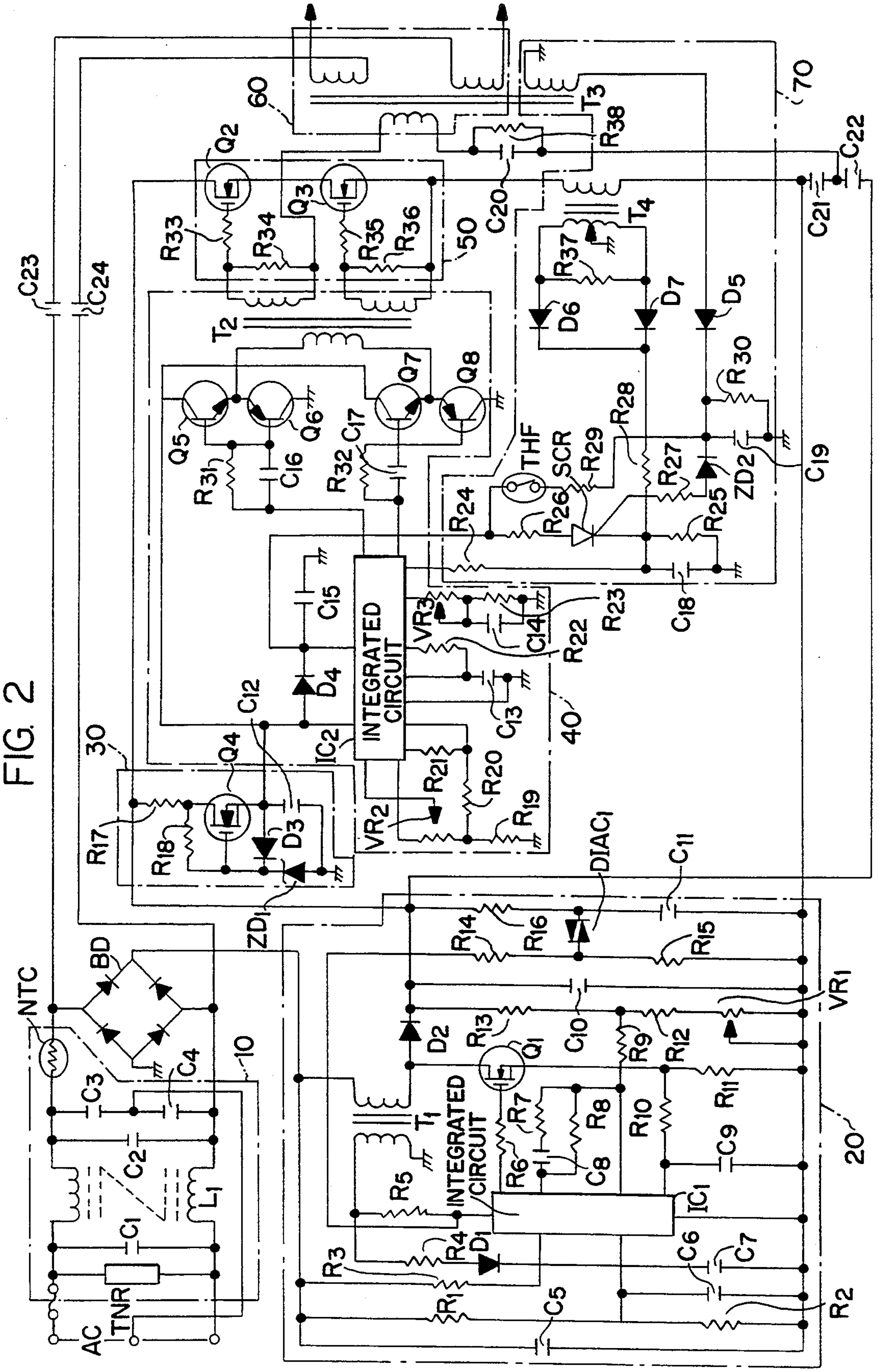
FIG. 2 is a circuit diagram of the present invention.

10: Line Filter 20: High power factor compensation circuit
30: Supplementary power source of control circuit 40: Control Circuit(PWM)
50: Inverter Circuit 60: Output Transformer
70: Protective Circuit, TNR: Surge Control Circuit
NTC: Power Thermister, $DIAC_1$,$DIAC_2$: Trigger Element
SCR: Thyristor, $IC_1$,$IC_2$: Integrated Circuit
$Q_1$-$Q_4$,$Q_9$: Field Effect Transistor(FET)
$Q_5$-$Q_8$: Transistor, BD: Bridge Diode
THF: Temperature Sensor, $D_1$, $T_1$–$T_5$: Transformer
$VR_1$-$VR_3$: Variable Resistance,
$R_1$-$R_{39}$: Resistance, $C_1$–$C_{28}$: Condenser
$D_1$-$D_8$: Diode, $ZD_1$–$ZD_2$: Zener Diode
MUX: Monostable multivibrator, L:Load

DETAILED DESCRIPTION OF THE INVENTION

The present invention relates to an ultrapowersaving neon inverter circuit which includes a protective function an adjustable and output voltage and luminous intensity. The result of the structure is to save more electric power by reducing power consumption and adjusting luminous intensity through proper output adjustment. The output adjustment is done according to the kinds of neon tubes without generating the output of a neon stabilizer when it is not loaded with a neon tube, or it is overloaded or its output voltage makes a short circuit or it is overheated.

Existing transformer-type neon stabilizers are short-lived and consume more electric power for example by leaking more electric current. When it is not loaded with a neon tube or it makes a short circuit, an arc is generated in the air and the danger of causing a loss of life or the danger of causing a loss of property by fire is possible. Therefore, it is not used widely because it is neither durable nor reliable.

The present invention has been provided so as to remove the problems mentioned above.

It is an object of the present invention to have a remarkable effect on saving electric power regardless of load conditions, to prolong the life of a neon stabilizer based on to high dependability, to employ a high power factor method, to reduce a loss of track and transformer to the maximum and to make peripheral apparatuses that create no problems in operation by lowering high frequency noises through the attachment of a line filter to the power source input terminal.

Another object of the present invention is to provide an inverter circuit which reduces power consumption to the maximum by preventing a stabilizer on the secondary side from internal damage through the complete interception of surge by a surge filter of input terminal, removing instability of oscillating frequency generated by fluctuations in input power source through constant voltage from the supplementary power source of control circuit and adjusting output voltage and luminous intensity through the adjustment of a change in oscillating frequency and duty.

Figure 3:
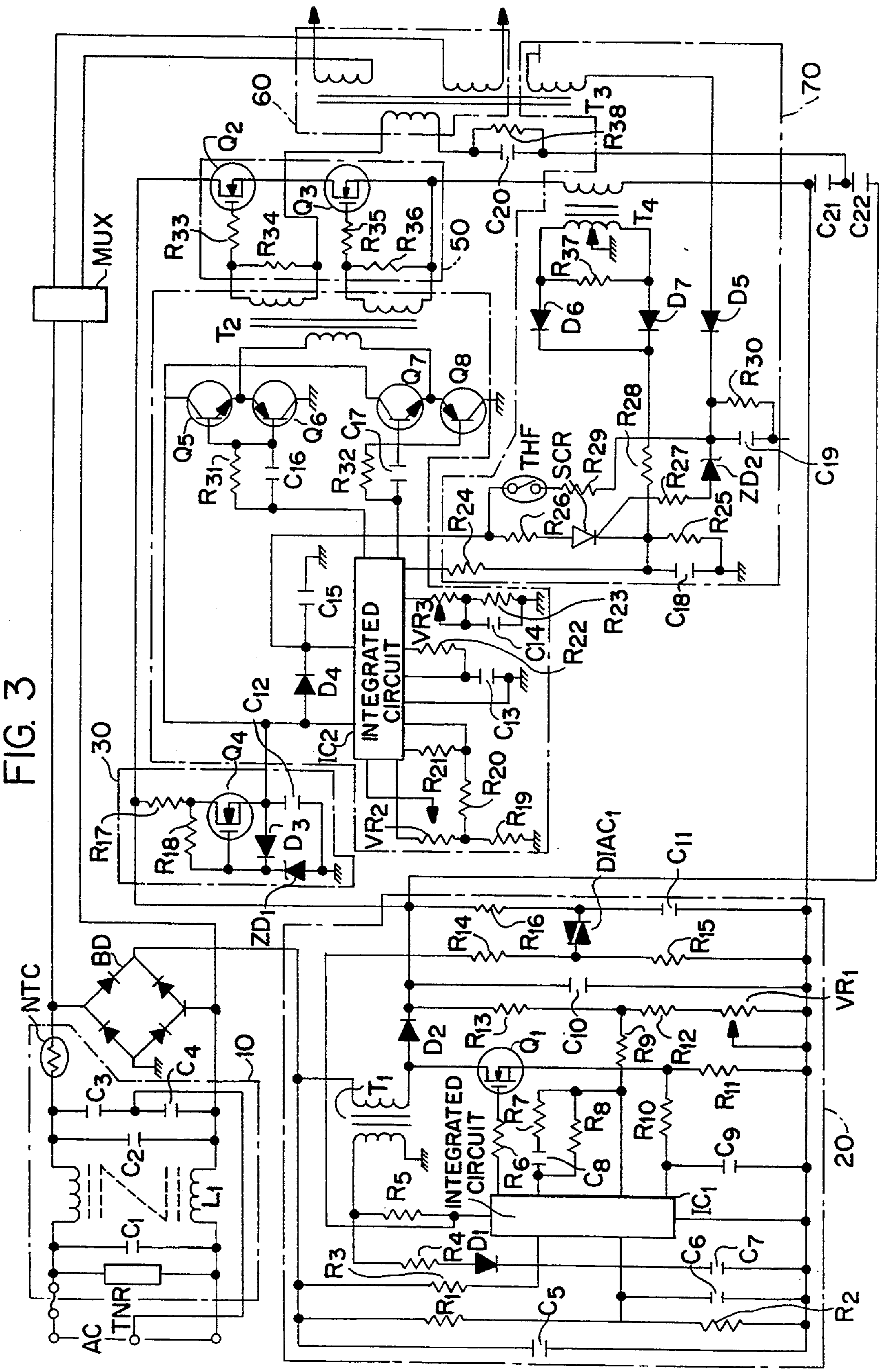
FIG. 3 is a circuit diagram embodiment of the present invention.
Figure 4:
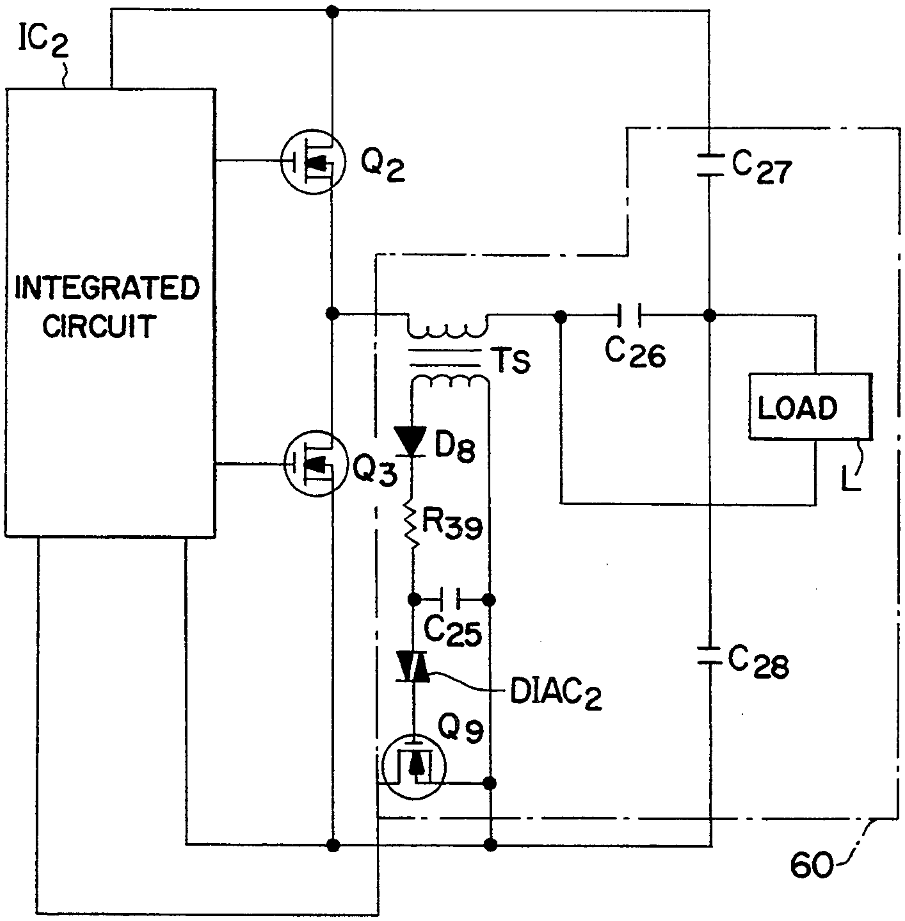
FIG. 4 is a circuit diagram for another embodiment of an output transformer according to the present invention.

A description of the structure of the present invention having those objects as set forth above is illustrated in the drawings as follows:

A line filter 10 is comprised of a surge control element TNR, a transformer $L_1$, condensers $C_1$–$C_4$ and a power thermister NTC which prevents an inrushing electric current. It is connected to an output transformer 60 via condensers $C_{23}$, $C_{24}$ through a bridge diode BD and then to a high power factor compensation circuit 20 comprised of an integrated circuit $IC_1$, condensers $C_5$–$C_{11}$, resistances $R_1$–$R_{16}$, diodes $D_1$, $D_2$, a transformer $T_1$, a field effect transistor $Q_1$, a trigger element $DIAC_1$ and a variable resistance $VR_1$. The high power factor compensation circuit 20 is connected to a control circuit 40 comprised of an integrated circuit $IC_2$, a diode $D_4$, transistors Q5–Q8, condensers $C_{13}$–$C_{18}$, resistances $R_{19}$–$R_{23}$, $R_{31}$, $R_{32}$, variable resistances $VR_2$, $VR_3$ and a transformer $T_2$ via the supplementary power source 30 of control circuit. The control circuit comprises resistances $R_{17}$, $R_{18}$ which set constant voltage, a field effect transistor $Q_4$, a zener diode $ZD_1$, a diode $D_3$ and a condenser $C_{12}$ but it is connected to an output transformer 60 through an inverter circuit 50. The inverter circuit is comprised of field effect transistors $Q_2$, $Q_3$ and resistances $R_{33}$–$R_{36}$. The output transformer 60 is constructed as to be connected to the control circuit 40 and inverter circuit 50 via a protective circuit 70. The protective circuit comprises of a transformer $T_4$ which detects overload, diodes $D_5$–$D_7$, a zener diode $2D_2$, a thyristor SCR, a temperature sensor THF, resistances $R_{24}$–$R_{30}$, $R_{37}$ and condensers $C_{18}$, $C_{19}$. To load an input power source on oscillating frequency by sinking the output terminal of output transformer 60 in the input power source, condensers $C_{23}$, $C_{24}$ are used or a monostable multivibrator MUX can be used as illustrated in FIG. 3. The output transformer 60 can also be used as the stabilizer of a mercury lamp or a sodium lamp by comprising a transformer $T_5$, a diode $D_8$, a resistance $R_{39}$, condensers $C_{25}$–$C_{28}$, a trigger element $DIAC_2$, a field effect transistor $Q_9$ and load L, as illustrated in FIG. 4.

The operation of the invention is described below with reference to the drawings. When an AC voltage is applied to the input terminal, electromagnetic waves and high-frequency waves are removed via the surge control element TNR, condenser $C_1$, transformer $L_1$, condensers $C_2$–$C_4$ and inrushing electric current-preventing power thermister NTC of line filter 10 and it is rectified through the bridge diode BD. Then, the rectified voltage is applied to the integrated circuit $IC_1$ through the condenser $C_5$, transformer $T_1$, resistances $R_1$–$R_5$, diode $D_1$, condensers $C_6$, $C_7$ of high power factor compensation circuit 20 and to the gate of field effect transistor $Q_1$ through resistance $R_6$ with high power factor compensated by said integrated circuit $IC_1$ and peripheral circuits, and so DC voltage rectified in the bridge diode BD according to the switching signal of field effect transistor $Q_1$ is boosted to the diode $D_2$ through the transformer $T_1$. Accordingly, it goes by way of a condenser $C_{10}$ to pass the amount of AC switched in the field effect transistor $Q_1$ by adjusting the DC output voltage boosted to the diode $D_2$ with variable resistance $VR_1$ via resistances $R_{13}$, $R_{12}$.

In order to make a trigger signal in the high power factor compensation circuit 20, resistances $R_7$–$R_{16}$, condensers $C_8$–$C_{11}$ and trigger element $DIAC_1$ are connected to the integrated circuit $IC_1$. Therefore, a power source is supplied to the integrated circuit $IC_2$ through the diode $D_4$ and condenser $C_{15}$ of control circuit 40 by making the DC voltage boosted to the diode $D_2$ into constant voltage regardless of fluctuations in input voltage in the supplementary power source 30 of control circuit comprized of a field effect transistor $Q_4$, a zener diode $ZD_1$, a diode $D_3$, resistances $R_{17}$, $R_{18}$ and a filtering condenser $C_{12}$.

Here, a PWM (pulse width modulation) IC or an IC for oscillation can also be used as the integrated circuit $IC_2$.

Accordingly, oscillating frequency of integrated circuit $IC_2$ is determined by resistance $R_{23}$, variable resistance $VR_3$ and condenser $C_{14}$ and it is possible to adjust luminous intensity by adjusting the ratio of duty through the adjustment of resistances $R_{19}$–$R_{21}$ and variable resistance $VR_2$ and it is also possible to adjust output voltage by resistance $R_{22}$ and condenser $C_{13}$.

When the output voltage of integrated circuit $IC_2$ is applied to the bases of driving transistors $Q_5$–$Q_8$ through resistances $R_{31}$, $R_{32}$ and condensers $C_{16}$, $C_{17}$ and said transistors $Q_5$–$Q_8$ are thereby turned on, the transformer $T_2$ connected to the emitter terminal thereof is driven and field effect transistors $Q_2$, $Q_3$ are alternately turned on by the resistances $R_{33}$–$R_{36}$ of inverter circuit 50 connected to the transformer $T_2$. Accordingly, switching operation is conducted by the turning on and off of said field effect transistors $Q_2$, $Q_3$ and constant high pressure is outputted by the generation of high pressure in the transformer $T_3$ of output transformer 60.

In the case where load is not connected thereto, or it is overloaded or output is short or it is overheated at this time, the protective circuit 70 operates, and so an overcurrent is detected by the transformer $T_4$ which detects overload and rectified in the diodes $D_6$, $D_7$ and a signal divided by resistances $R_{28}$, $R_{25}$ via an impedance resistance $R_{37}$ is applied to the integrated circuit $IC_2$ of control circuit 40 through resistance $R_{24}$ and the output of said integrated circuit $IC_2$ is thereby discontinued.

When the voltage or surge detected by the output transformer 60 is rectified through a diode $D_5$ and filtered by a resistance $R_{30}$ and a condenser $C_{19}$ and then a signal greater than the constant voltage of zener diode $ZD_2$ is generated in the gate of thyristor SCR via the zener diode $ZD_2$ and resistance $R_{27}$, said thyristor SCR turns on and it is applied to the reset terminal of the integrated circuit $IC_2$ of control circuit 40, and so the output of integrated circuit $IC_2$ is suspended and high-pressure output is thereby discontinued.

When a signal which is inputted rises above set temperature during operation by the temperature sensor THF, the temperature sensor THF turns on and drives the thyristor SCR via the zener diode $ZD_2$ and resistance $R_{27}$ like when it is short open through resistance $R_{29}$, and so the output of the integrated circuit $IC_2$ of control circuit 40 is discontinued and, as it sinks each output terminal of output transformer 60 in the input power source through condensers $C_{23}$, $C_{24}$, high-frequency waves (oscillating frequency) can be loaded on the input power source and great output is thereby obtained.

Moreover, in sinking the output terminal of output transformer 60 in the input power source, oscillating frequency can be loaded by using the monostable multivibrator MUX without using the condensers $C_{23}$, $C_{24}$, as illustrated in FIG. 3, and so great output is obtainable even by the small measure of capacity.

Furthermore, as illustrated in FIG. 4, if the output transformer 60 is transformed, it can be used in the mercury lamp or sodium lamp regardless of capacity and luminous intensity and output voltage are adjustable.

As heretofore described in detail, the present invention is an invention which compensates power factor up to almost 100% by using not a general power factor circuit but a high power factor integrated circuit, produces a remarkable effect on power saving regardless of load conditions and prolongs a stabilizer's life thanks to high dependability. It is also durable, reduces a loss of track and transformer to the maximum and adjusts output voltage and luminous intensity.

What is claimed is:

1. A neon circuit including a protective function for providing an adjustable output voltage and luminous intensity comprising:

a line filter including a surge control element, a transformer, a plurality of condensers and a power thermistor, so that in rushing electric current is prevented;

a high power factor compensation circuit operatively connected to said line filter and connected to an output transformer via two condensers, the high power factor compensation circuit being operatively connected to an integrated circuit of a control circuit via a supplementary power source of the control circuit, so that said high power factor compensation circuit oscillates stably;

said control circuit including a field effect transistor which produces constant voltage regardless of an input power source, a zener diode, a diode, a plurality of resistances and a condenser; and means for connecting said control circuit to an invert circuit, said invert circuit operatively connected to the output transformer, said invert circuit including means to output high current, so that the output transformer discontinues an output by connection to an integrated circuit of the control circuit through a protective circuit.

2. The neon circuit according to claim 1, wherein the high power factor compensation circuit includes as elements an integrated circuit, a plurality of condensers, a plurality of resistances, a diode, a transformer, a trigger element, a diode boosting DC voltage and a variable resistance for adjusting the DC voltage, all of said elements operatively connected to each other.

3. The neon circuit according to claim 1, further including means for adjusting luminous intensity by adjusting the ratio of duty, of a resistance and a condenser.

4. The neon circuit according to claim 1, wherein the protective circuit comprises a transformer for detecting overload, a plurality of diodes, a plurality of condensers, resistances a zener diode, a thyristor all operatively connected to each other.

5. The neon circuit according to claim 1, including a monostable multi-vibrator.

6. The neon circuit according to claim 1, wherein the output transformer is connected to a transformer, a diode, a resistance, a plurality of condensers, a trigger element, a field effect transistor, so that when a mercury or sodium lamp is connected as a load output, voltage and luminous intensity of the mercury or sodium lamps is adjustable regardless of their capacity.

7. The neon circuit according to claim 2, wherein the output transformer is connected to a diode, a resistance, a plurality of condensers, a trigger element, a field effect transistor, so that when a mercury or sodium lamp is connected as a load, output voltage and luminous intensity of the mercury or sodium lamps is adjustable regardless of their capacity.

8. The neon circuit according to claim 3, wherein the output transformer is connected to a diode, a resistance, a plurality of condensers, a trigger element, a field effect transistor, so that when a mercury or sodium lamp is connected as a load output voltage and luminous intensity of the mercury or sodium lamps is adjustable regardless of their capacity.

9. The neon circuit according to claim 4, wherein the output transformer is connected to a diode, a resistance, a plurality of condensers, a trigger element, a field effect transistor, so that when a mercury or sodium lamp is connected as a load output voltage and luminous intensity of the mercury or sodium lamps is adjustable regardless of their capacity.

10. The neon circuit according to claim 5, wherein the output transformer is connected to a diode, a resistance, a plurality of condensers, a trigger element, a field effect transistor, so that when a mercury or sodium lamp is connected as a load output voltage and luminous intensity of the mercury or sodium lamps is adjustable regardless of their capacity.

* * * * *